United States Patent
Ganesan

(10) Patent No.: US 6,565,120 B2
(45) Date of Patent: *May 20, 2003

(54) SAFETY RESTRAINT FOR A HORIZONTAL PASSENGER

(76) Inventor: Palvannanathan Ganesan, 16602 Capitol Plz., No. 1, Omaha, NE (US) 68118

( * ) Notice: Subject to any disclaimer, the term of this patent is extended or adjusted under 35 U.S.C. 154(b) by 0 days.

This patent is subject to a terminal disclaimer.

(21) Appl. No.: 09/795,769

(22) Filed: Feb. 28, 2001

(65) Prior Publication Data

US 2001/0008337 A1 Jul. 19, 2001

Related U.S. Application Data

(63) Continuation-in-part of application No. 09/289,856, filed on Apr. 12, 1999, now Pat. No. 6,217,069.

(51) Int. Cl.⁷ .............................................. B60R 22/00
(52) U.S. Cl. ..................................... 280/801.1; 297/468
(58) Field of Search ........................ 280/801.1, 801.2, 280/748, 749, 808; 297/468, 483, 486; 296/190.02; 5/118, 424; 128/875, 876

(56) References Cited

U.S. PATENT DOCUMENTS

| 2,633,906 | A | 4/1953 | Franz .......................... 155/189 |
| 3,385,633 | A | 5/1968 | Aizley ......................... 297/389 |
| 3,529,864 | A | 9/1970 | Rose et al. .................. 297/387 |
| 4,064,574 | A | 12/1977 | Schnitzler ......................... 5/82 |
| 4,205,670 | A | 6/1980 | Owens ........................ 128/134 |
| 4,218,074 | A | 8/1980 | Crawford ..................... 280/801 |
| 4,709,966 | A | 12/1987 | Parkinson et al. ........... 297/473 |
| 4,750,478 | A | 6/1988 | Bergeron ....................... 128/70 |
| 4,770,459 | A | 9/1988 | Nakaiwa et al. ............... 296/65 |
| D312,992 | S | 12/1990 | Liebman .................... D12/128 |
| 5,131,682 | A | 7/1992 | Reed ........................... 280/801 |
| D332,930 | S | 2/1993 | Clark et al. ................ D12/128 |
| 5,211,186 | A | 5/1993 | Shoemaker et al. ......... 128/870 |
| 5,226,698 | A | 7/1993 | Harrison ...................... 297/485 |
| 5,233,156 | A | 8/1993 | Chan et al. ............. 219/121.52 |
| 5,375,879 | A | 12/1994 | Williams et al. ............. 280/749 |
| 5,536,042 | A | 7/1996 | Williams et al. ............. 280/749 |
| 5,570,933 | A | * 11/1996 | Rouhana et al. ............. 297/483 |
| 5,660,445 | A | * 8/1997 | Murray ........................ 297/466 |
| 5,727,814 | A | 3/1998 | White .......................... 280/748 |
| 5,752,719 | A | * 5/1998 | Mitschelen et al. ....... 280/801.1 |
| 6,042,190 | A | 3/2000 | Mathe et al. ................. 297/483 |
| 6,217,068 | B1 | * 4/2001 | Trainum et al. .......... 280/801.1 |
| 6,217,069 | B1 | * 4/2001 | Ganesan ................... 280/801.1 |

FOREIGN PATENT DOCUMENTS

EP          614788      *  9/1994

* cited by examiner

Primary Examiner—Paul N. Dickson
Assistant Examiner—David R. Dunn
(74) Attorney, Agent, or Firm—Thomte, Mazour & Niebergall; Shane M. Niebergall

(57) ABSTRACT

The present device provides a plurality of belts to restrain a horizontal passenger within a vehicle. In a preferred embodiment, a diagonal belt is secured to the vehicle proximal the side of the sleeping surface near the hips of the passenger. Where the passenger is lying on his back, the diagonal belt extends toward the shoulder of the passenger and is in contact with the back of the passenger. It is looped over the shoulder and passes over the chest of the passenger. It is then secured to the vehicle proximal the hips of the passenger. The passenger may lie on his side or chest, as well. The restraint also includes one or two additional belts positioned transverse to the sleeping surface. The first transverse belt extends over the chest and under the arms of the passenger; the second transverse belt extends over the thighs of the passenger. Another preferred embodiment of the present invention uses a single belt to restrain the passenger both transversely and longitudinally. A second additional belt can be incorporated with the single belt safety restraint over the chest of the passenger to increase security. The safety restraint comfortably protects a horizontal passenger from forces that may be applied from any direction.

12 Claims, 18 Drawing Sheets

SAFETY RESTRAINT FOR A HORIZONTAL PASSENGER

CROSS-REFERENCE TO RELATED APPLICATION

This is a continuation-in-part application of Petitioner's earlier application Ser. No. 09/289,856 filed Apr. 12, 1999, now U.S Pat. No. 6,217,069 entitled A SAFETY RESTRAINT FOR A HORIZONTAL PASSENGER.

BACKGROUND OF THE INVENTION

The present apparatus relates generally to a safety belt configuration for use in vehicles by passengers who are lying down.

Many vehicles are equipped with safety belts for restraining passengers within the vehicle during abrupt changes in velocity, such as collisions. Most vehicles are designed to carry passengers in a seated position with safety belts designed to restrain passengers in the seated position. Passengers that wish to lie on such seats must forego the safety of a safety belt. Several prior art attempts have been made to overcome this shortcoming in design. Several products are currently on the market which allow infants to sleep in a substantially semi-reclined fashion, but are not designed to allow the infant to lie flat or to lie on his/her side. These products are not suitable for use by older children or adults because the child is displaced perpendicular to the length of the seat. In order to have room to lie down comfortably, adults and children must lie down along the length of the seat.

One attempt to provide a safety belt for a horizontal passenger in a vehicle is disclosed in U.S. Pat. No. 5,131,682 issued to R. Reed on Jul. 21, 1992, for a seat belt apparatus for sleeping passengers. That patent discloses a single belt, similar to a lap belt, which is positioned transverse to the length of a bench-style seat, with the belt being designed to be worn around the midsection of the user. Also, beds in semitractors have been equipped with two safety belts arranged transverse to the sleeping surface which extend over the entire sleeping surface.

These arrangements have several shortcomings. First, the prior art restraints offer little or no protection against forces applied in a direction parallel to the longitudinal axis of the sleeping individual. Secondly, the prior art restraints have no mechanism which retains the belt or belts in a stationary position relative to the body of a sleeping passenger, allowing the restraints to migrate to vulnerable areas of the passenger's body, such as the neck, or to slip off the passenger entirely.

In the co-pending application, a safety restraint is disclosed which solves the above-enumerated problems. The invention disclosed herein represents an improvement over the invention of the co-pending application.

SUMMARY OF THE INVENTION

The present device provides at least one belt for restraining a horizontal passenger within a vehicle. In one embodiment, a diagonal belt is secured to the vehicle adjacent the side of the sleeping surface near the hips of the passenger. When the passenger is lying on his/her back, the diagonal belt extends toward the shoulder of the passenger while in contact with the back of the passenger, is looped over the shoulder, passes over the passenger's chest, and is then secured to the vehicle adjacent the hips of the passenger. The diagonal belt is secured to the same side of its origin in a "Kuta" style belt or to the opposite side of its origin in a "Chena" style belt. The restraint of this embodiment may also include additional belts positioned transverse to the sleeping surface. For example, a first transverse belt could extend over the chest and under the arms of the passenger and a second transverse belt could extend over the thighs of the passenger.

In another embodiment, a single belt is used to perform the function of both a diagonal shoulder belt and a transverse thigh belt. The single belt is provided with first and second ends that are each secured to the vehicle on opposite sides of the sleeping surface near the hips of the passenger. A buckle is attached to the belt, adjacent the first end of the belt. A tab is adjustably secured to the belt, adjacent the second end thereof. An adjustable length of the belt extends between the buckle and the tab. When the passenger is lying on his/her back, this length of belt is extended along the passenger's back from a point near the passenger's hip toward his/her shoulder. The belt is looped over the passenger's shoulder so that it extends from his/her shoulder to the tab, adjacent the passenger's hip and the second end of the belt. The passenger then pulls the tab across his/her body and secures it into the buckle, adjacent the passenger's other hip and the first end of the belt. This moves the shoulder portion of the belt so that it extends diagonally from the passenger's shoulder, across his/her chest to the tab and buckle connection. The restraint of this embodiment may also include a second transverse belt, which would extend over the chest and under the arms of the passenger.

When used with a sleeping surface having an accessible underside, as are found in many passenger vans, the transverse belts wrap around the sleeping surface. When used with a sleeping surface having an inaccessible underside, as are found in automobile back seats and semi-tractor beds, the transverse belts are secured adjacent one side of the sleeping surface and secured adjacent the opposite side of the sleeping surface. When used with a sleeping surface having an adjacent padded wall, such as the back rest of a seat of a car, the diagonal belt and the transverse belts may be mounted on one side of the sleeping surface and positioned entirely above the sleeping surface. As shown hereinafter, the safety restraint comfortably protects a horizontal passenger from forces that may be applied from any direction.

Accordingly, one object of the invention is to provide a device which can be used by a horizontal passenger as a safety restraint.

Another object of the invention is to maintain the relationship of the belts to the body of the passenger while the passenger is sleeping.

Yet another object of the invention is to provide a safety restraint which offers protection from impact from any direction.

Another object of the invention is to provide a safety restraint which is comfortable and operational for a passenger lying on his back, side, or chest.

Another object of the invention is to provide a device which serves as a safety restraint for a horizontal passenger, but does not expose the passenger to extensive soft tissue damage.

Another object of the invention is to provide a safety restraint which is operational in a number of different settings.

Another object of the invention is to provide a safety restraint for securing the shoulder and thigh areas of a horizontal passenger with a single belt.

DESCRIPTION OF THE PREFERRED EMBODIMENT

Figure 1:
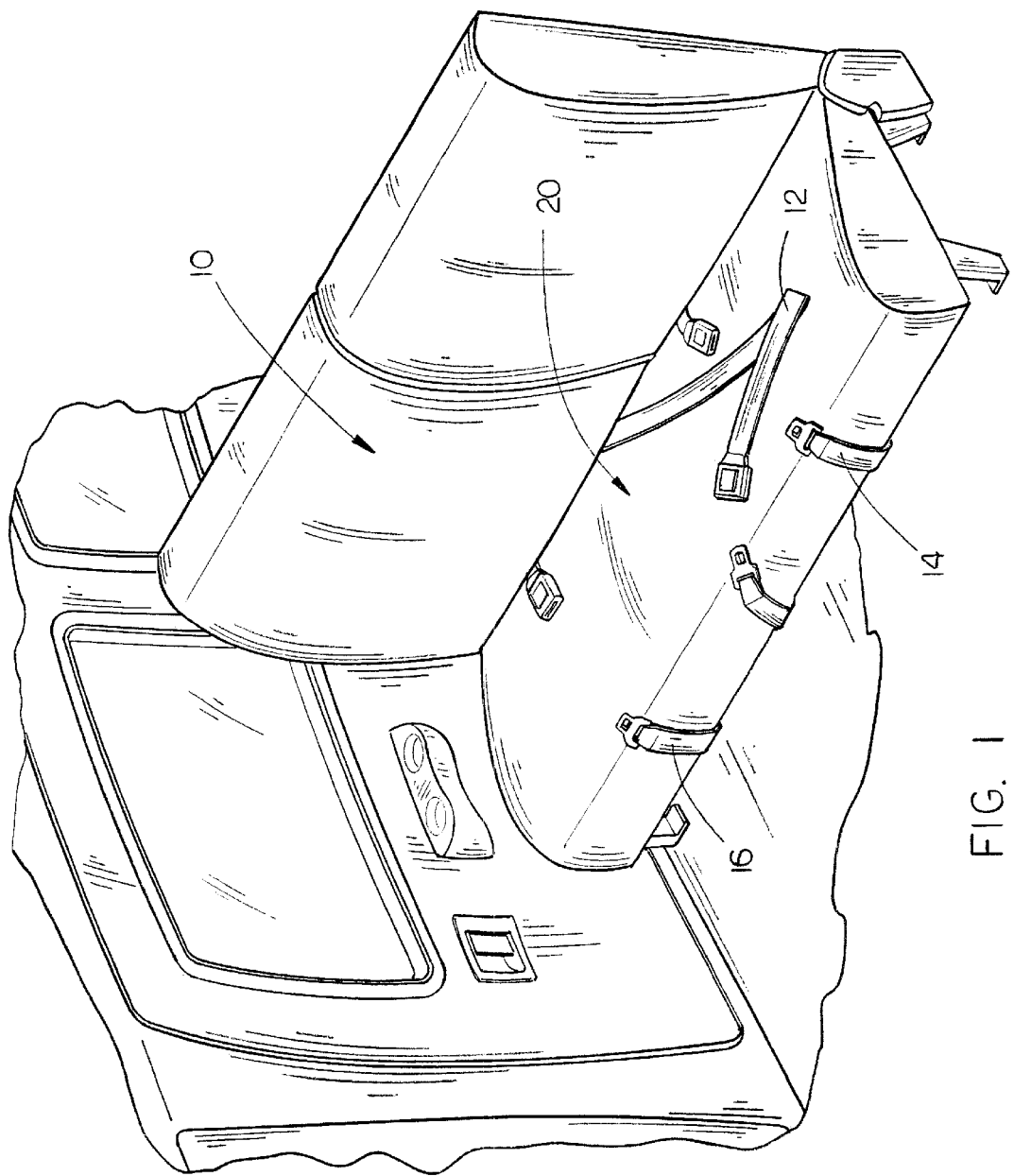
FIG. 1 is a perspective view of the safety restraint in a passenger vehicle.
Figure 4:
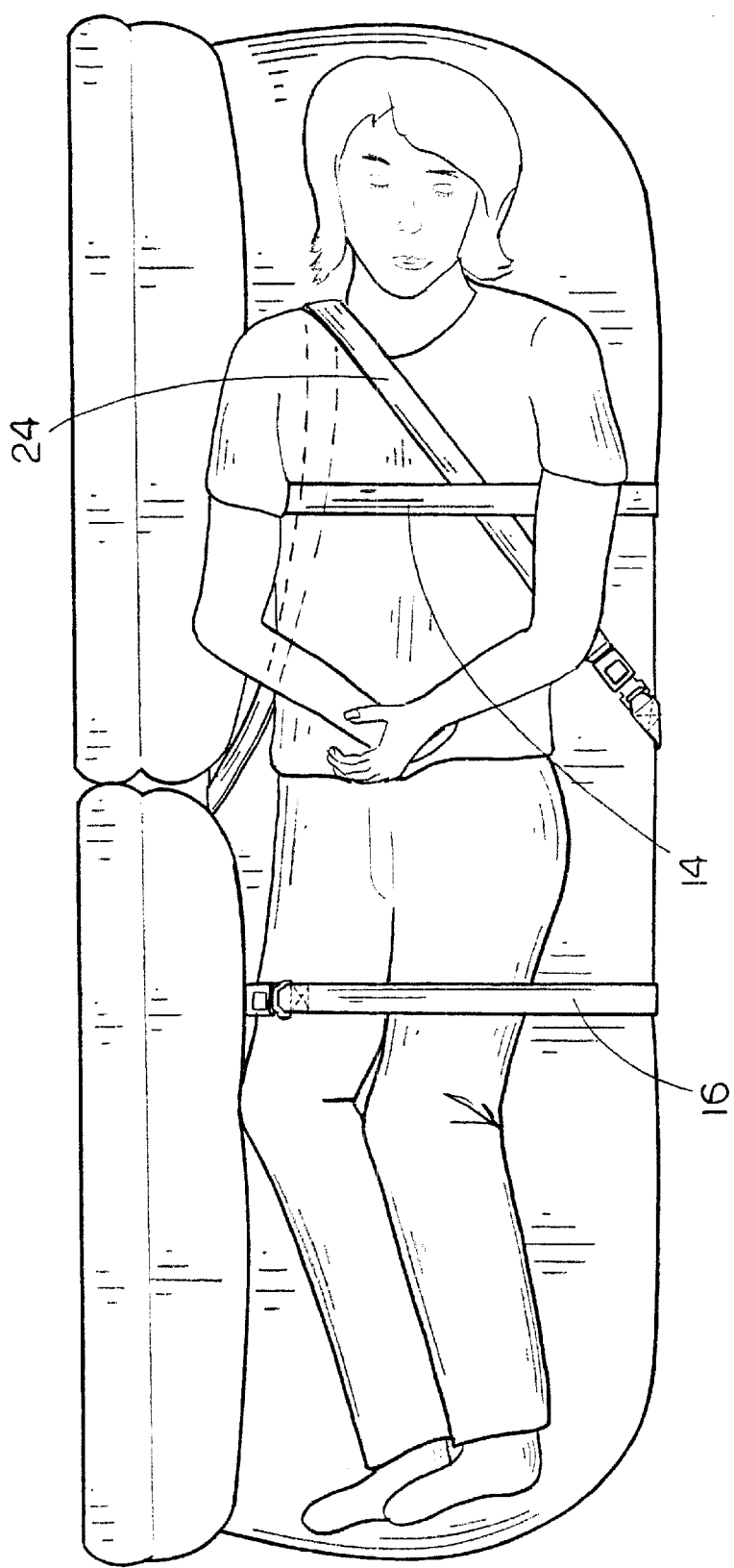
FIG. 4 is a top view of the safety restraint in use with the "Chena" style diagonal belt.

A preferred embodiment of the safety restraint is illustrated in the perspective view of FIG. 1. As seen in this view, there are three main components to the safety restraint 10 of the present invention; namely, a diagonal belt 12, a transverse first belt 14, and a transverse second belt 16. As shown in FIG. 4, diagonal belt 12 is looped over the shoulder of the passenger, first belt 14 is secured about the chest and under the arms of the passenger, and second belt 16 is secured about the thighs of the passenger. Each of these main components may be further separated into constituent components and used in a plurality of combinations for different purposes, as seen in the remaining Figures.

Figure 6:
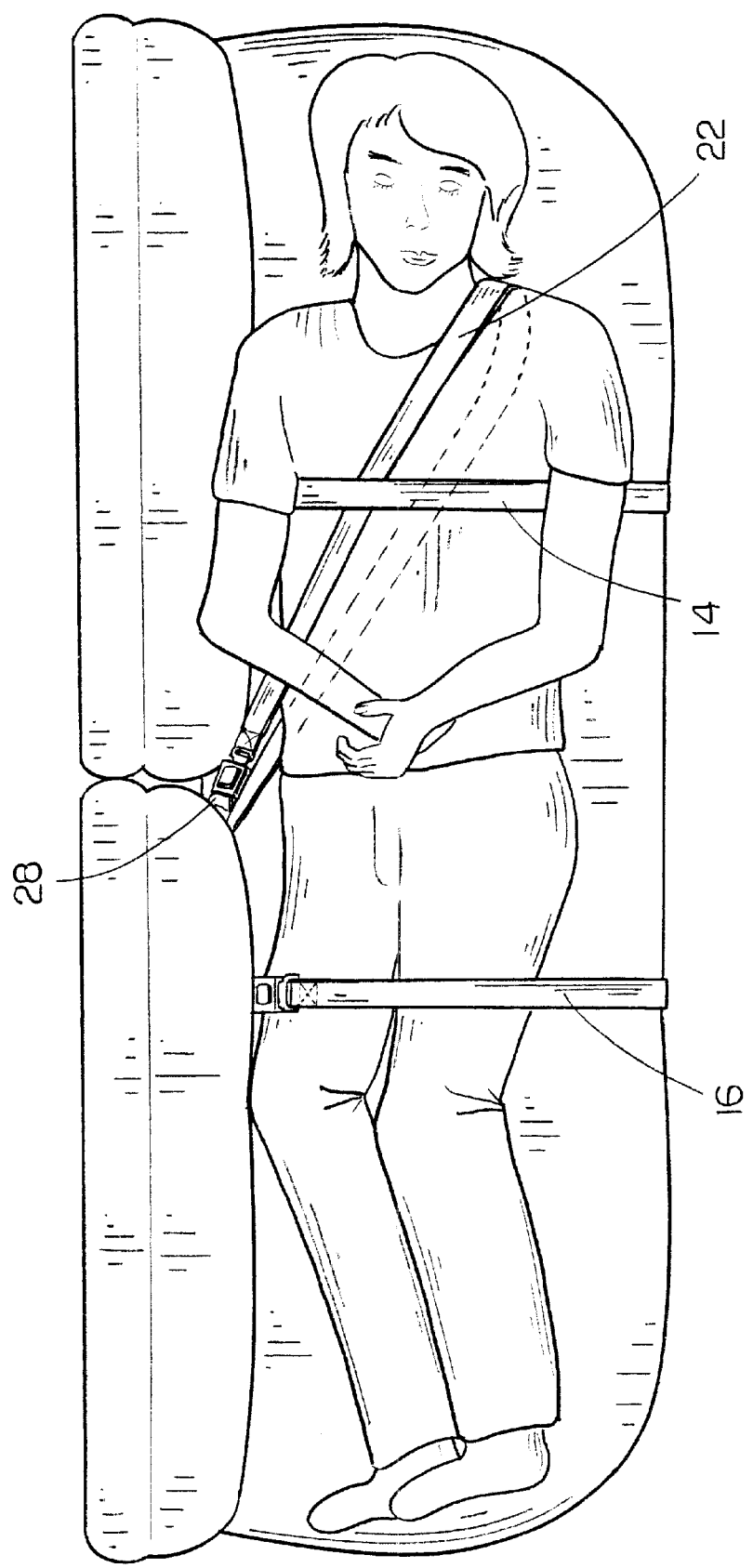
FIG. 6 is a top view of the safety restraint in use with a "Kuta" style diagonal belt.

Diagonal belt 12 may be anchored to the frame member 18 of the sleeping surface 20, to the frame of the vehicle, or to other components of the safety restraint 10 as described herein. Diagonal belt 12 may be configured generally in one of two ways. In one configuration, diagonal belt 12 may be secured proximal a side of the sleeping surface 20 near the hip of the passenger, extended over the upper surface of the sleeping surface 20, then over the shoulder of the horizontal passenger to be secured at a point near its origin. This configuration, shown in FIG. 6, is known as a "Kuta" belt 22. Alternatively, diagonal belt 12 may be anchored proximal a side of the sleeping surface 20 near the hip of the passenger, looped over the shoulder of the passenger and secured proximal the opposite side of the sleeping surface 20 transverse to its point of origin. This configuration, shown in FIG. 4, is known as a "Chena" belt.

Preferably, diagonal belt 12 is mounted in a fixed position and is comprised of an adjustable belt 26 which extends around the passenger, and a fixed belt 28 to which the adjustable belt 26 is connected by selectively releasable means 30. Selectively releasable means 30 preferably consists of two elements: buckle 32 and corresponding tab 34. It is to be understood that either element, buckle 32 or tab 34, may be mounted on the adjustable belt 26 with the other element mounted on the fixed belt 28. The combination of the buckle 32 and the corresponding tab 34 is known in the art. Other means for joining belts, which are known in the art, may by used for the selectively releasable means 30.

Diagonal belt 12 must be of adjustable length to circumscribe passengers of different sizes. This may be accomplished by incorporating a selectively locking mechanism 36 with the adjustable belt 26. Such mechanisms are known in the art for rolling and unrolling a belt during initial adjustment and retaining the belt at the adjusted length during impact. Alternatively, adjustable belt 26 may incorporate a conventional frictional buckle 38, the use of which is also known in the art. Other means of making a belt easily adjustable, which are known in the art, may be incorporated within the adjustable belt 26.

Safety restraint 10 may also include a transverse first belt 14 and a transverse second belt 16. Like the diagonal belt 12, each of first and second belts 14 and 16 must be of adjustable length. This may be accomplished by any conventional means, such as those previously described. The manner in which the first and second belts 14 and 16 are mounted within the vehicle depends on the environment in which the safety restraint 10 is used. If, as shown in FIG. 1, the sleeping surface 20 has an accessible underside, first belt 14 and second belt 16 may each be comprised of a single belt looped around the portion of the sleeping surface 20 on which the passenger is to lie. Each has first and second ends 40 and 42 which are joined together by selectively releasable means 30, as previously described.

Figure 13:
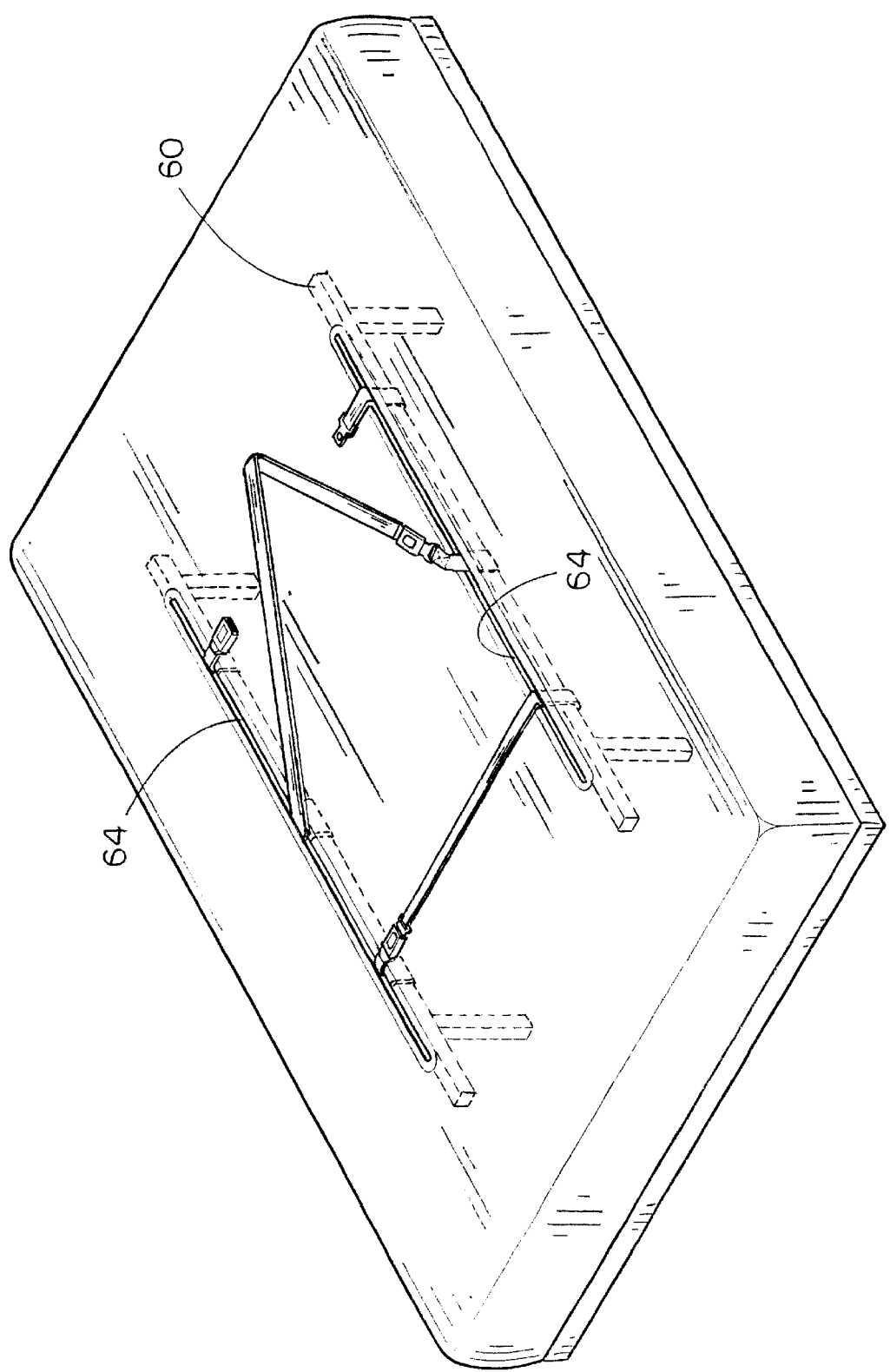
FIG. 13 is a perspective view of the safety restraint used in conjunction with a flat bed having rigid supports proximal both sides of the bed.

If, on the other hand, the sleeping surface has an underside which is inaccessible, such as that shown in FIG. 13, first and second belts 14 and 16 must each include an adjustable belt 26, a fixed belt 28, and a selectively releasable means 30 for joining the adjustable and fixed belts 26 and 28. The arrangement of the adjustable belt 26, the fixed belt 28, and the selectively releasable means 30 may also be implemented if sleeping surface 20 has an accessible underside.

Figure 15:
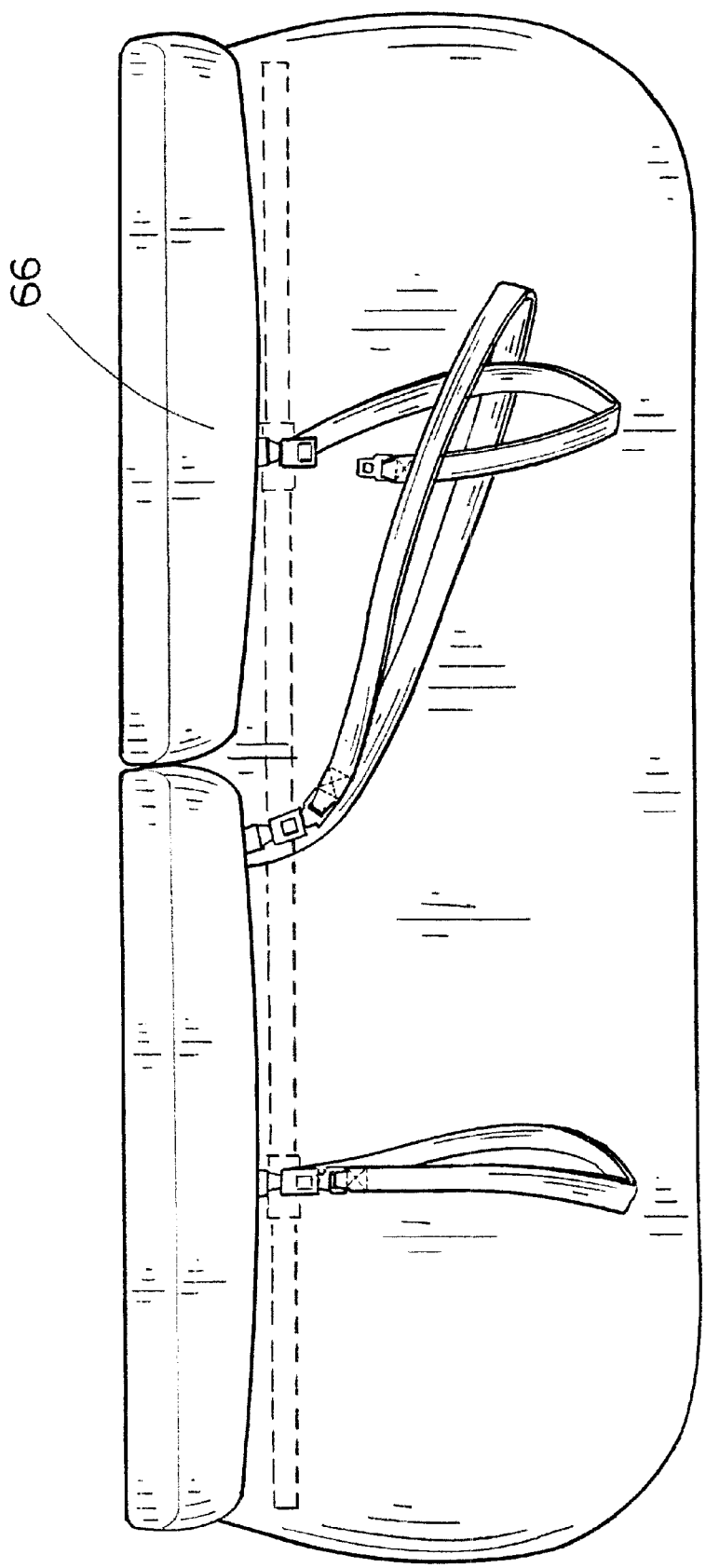
FIG. 15 is a top view of the safety restraint with first and second belts adapted to lie on the sleeping surface.

For each of the first and second belts 14 and 16, adjustable belt 26 and fixed belt 28 may be mounted in one of two ways. Adjustable belt 26 must be mounted proximal one side of the sleeping surface 20. Fixed belt 28 may be mounted proximal the opposite side of the sleeping surface 20 such that first or second belt 14 or 16 extends over the passenger, as shown in FIG. 13. Alternatively, fixed belt 28 may be mounted at the same location as the adjustable belt 26 such that first or second belt 14 or 16 extends between the passenger and the sleeping surface 20, then extends over the passenger and back to the point of its origin, as shown in FIG. 15. It is preferred that the configuration shown in FIG. 15 be employed only in an environment where the sleeping surface 20 is located in close proximity to an upright padded surface 66, such as a padded wall or the upright portion of a seat. Adjustable belt 26 and fixed belt 28 must be anchored proximal the side of the sleeping surface 20 adjacent the upright padded surface 66.

Figure 2:
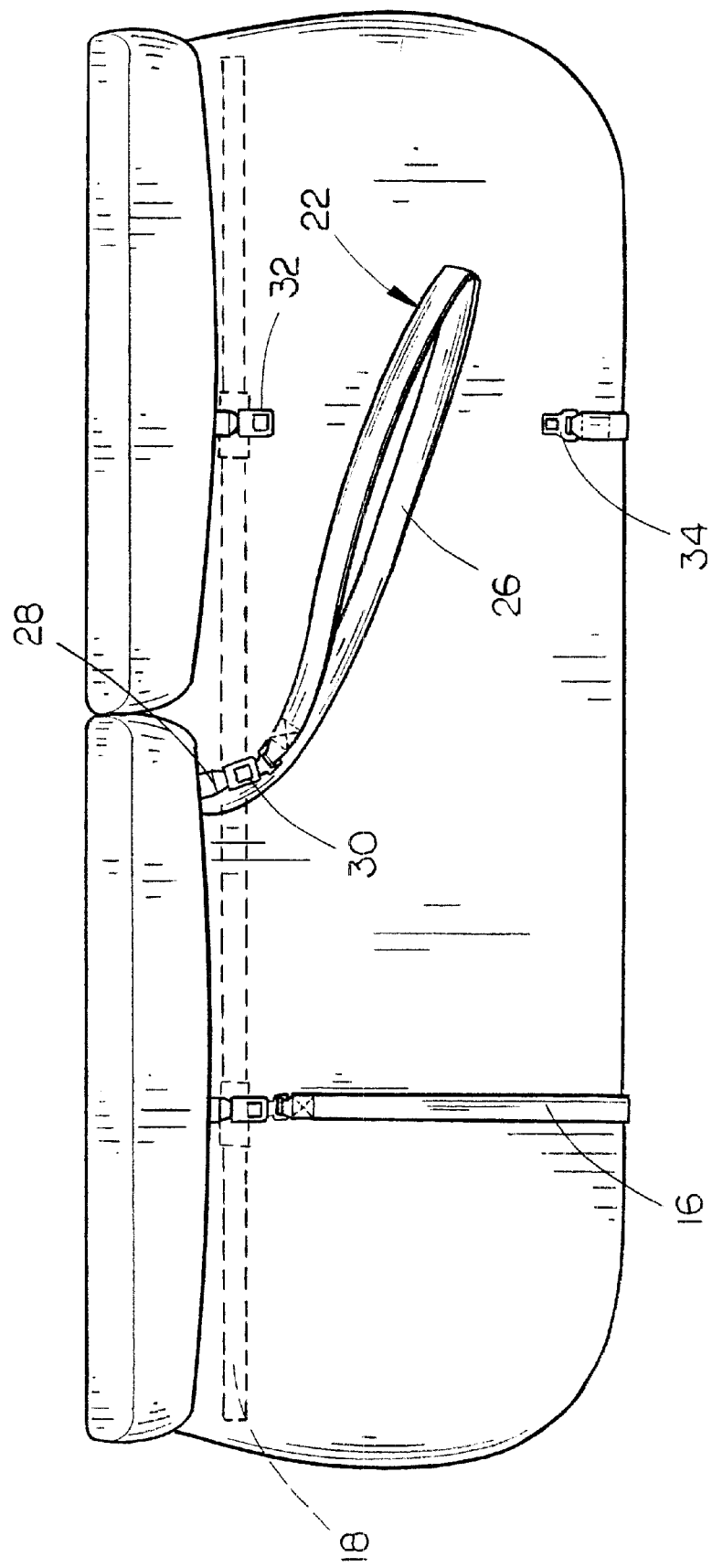
FIG. 2 is a top view of the safety restraint with a "Kuta" style diagonal belt.
Figure 3:
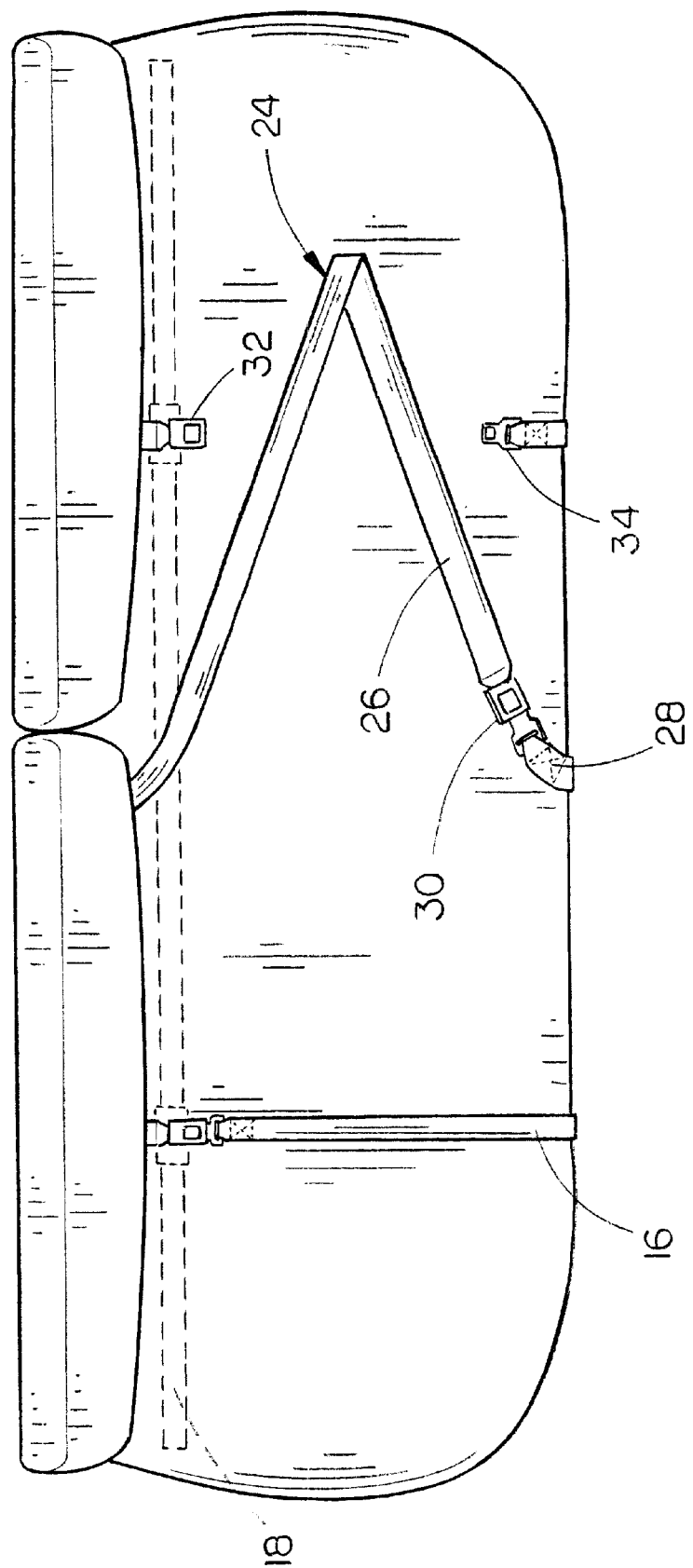
FIG. 3 is a top view of the safety restraint with a "Chena" style diagonal belt.

First and second belts 14 and 16 must be mounted such that they do not move lengthwise along the sleeping surface 20. This may be achieved in numerous ways. As seen in FIG. 2, first and second belts 14 and 16 are rigidly affixed to a frame member 18 of the sleeping surface 20. As previously stated, first belt 14 is to be secured about the chest and under the arms of the passenger, and second belt 16 is to be secured about the thighs of the passenger. If the first and second belts 14 and 16 are in fixed positions along the length of sleeping surface 20, safety restraint 10 may only accommodate passengers within an acceptable range of height. For example, if a child were to use the safety restraint 10 as described, first belt 14 may be secured about the chest of the child, but second belt 16 may be secured about the child below the knees, providing inadequate restraint. It is therefore preferred that if rigidly affixed transverse belts are to be used, three or more transverse belts be provided and spaced apart lengthwise along the sleeping surface 20. The passenger may then implement the belts that properly secure him to the sleeping surface 20. Depending on the positioning of the sleeping surface within the vehicle and the size of the passenger, it is contemplated that diagonal belt 12 could be used alone or in combination with one or both of first belt 14 or second belt 16 to adequately restrain the passenger.

Figure 10:
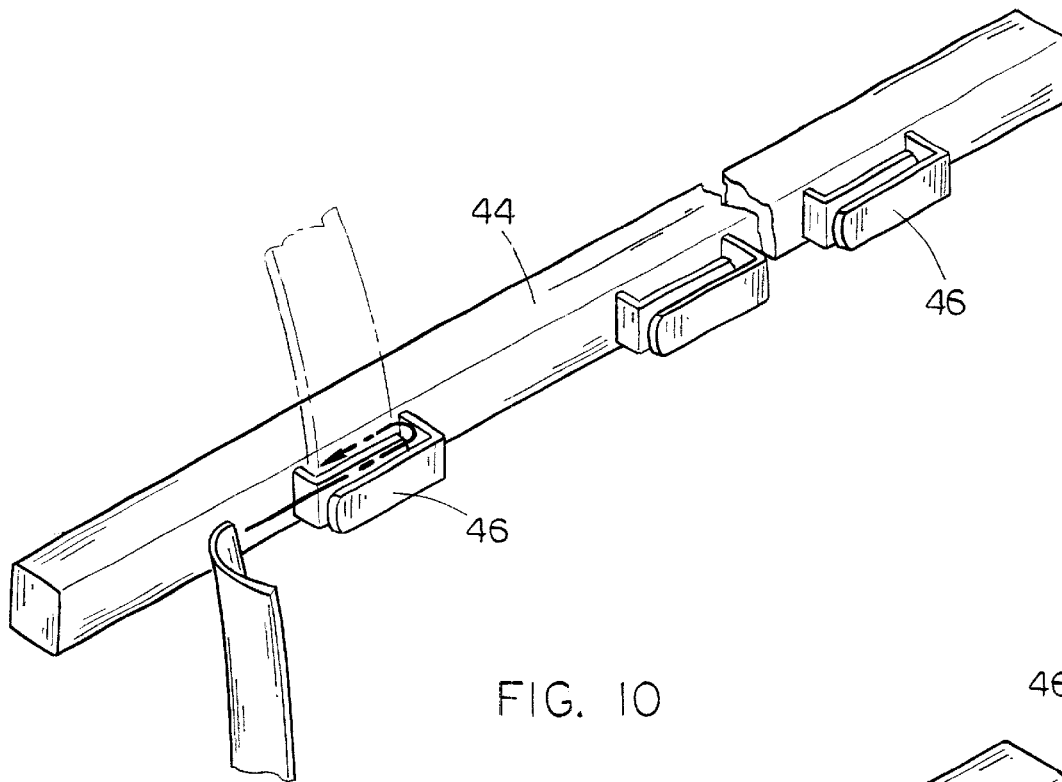
FIG. 10 is a perspective view of a belt and its relationship with an elongated member having a plurality of fixed brackets.

Preferably, first and second belts 14 and 16 may by adjusted longitudinally and then secured in position. This may be achieved by providing an elongated member 44 that is adapted to receive at least the first and second belts 14 and 16 in spaced-apart lengthwise relation. Elongated member 44 may include a plurality of spaced-apart overlapping tabs 46 adapted to receive a belt threaded therein,as shown in FIG. 10. Elongated member 44 must be attached to the frame of the vehicle, a frame member 18 of the sleeping surface 20, or some other substantially stationary surface within the vehicle.

Figure 7:
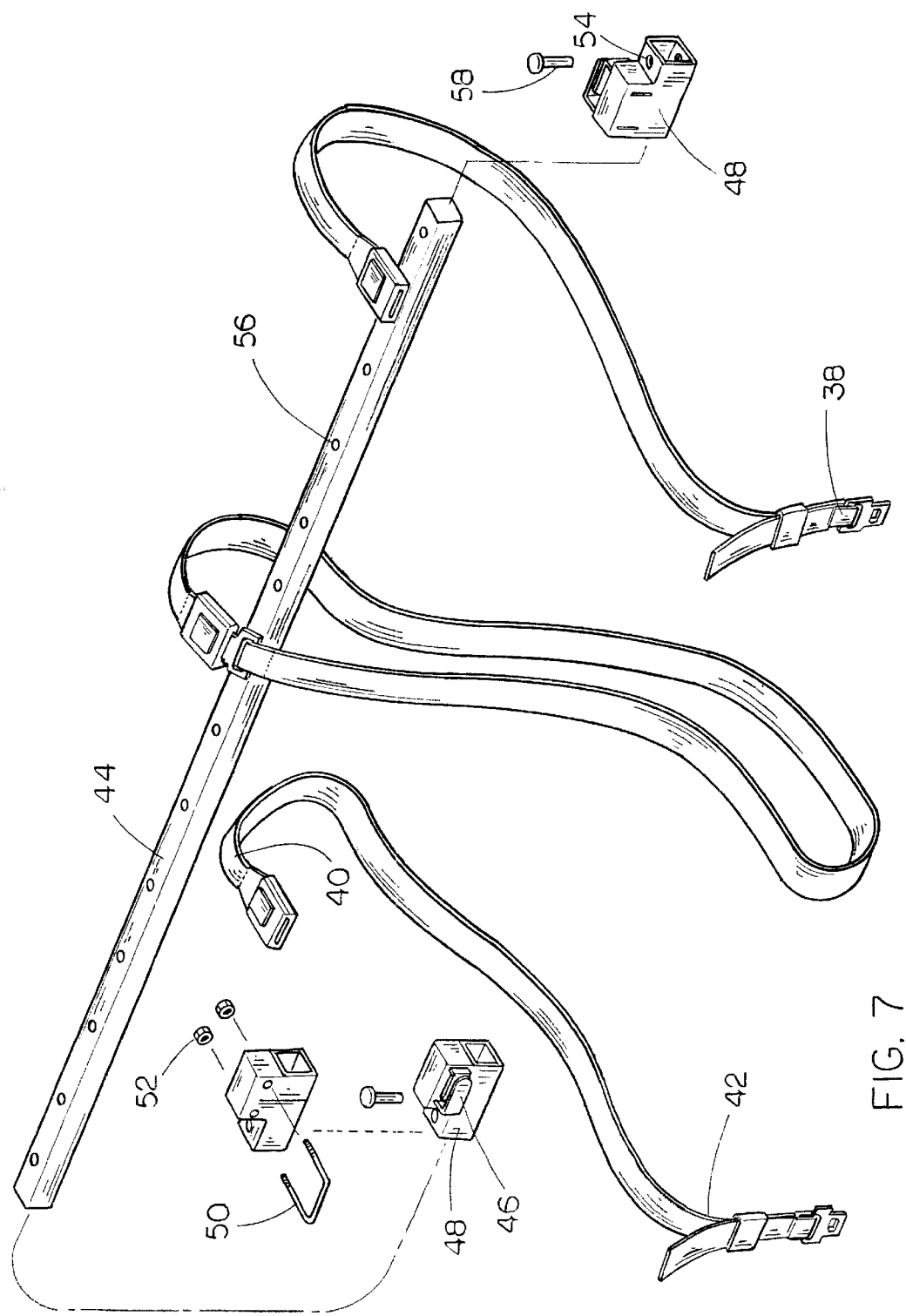
FIG. 7 is an exploded perspective view of an elongated member used in conjunction with the safety restraint and including a plurality of brackets.
Figure 8:
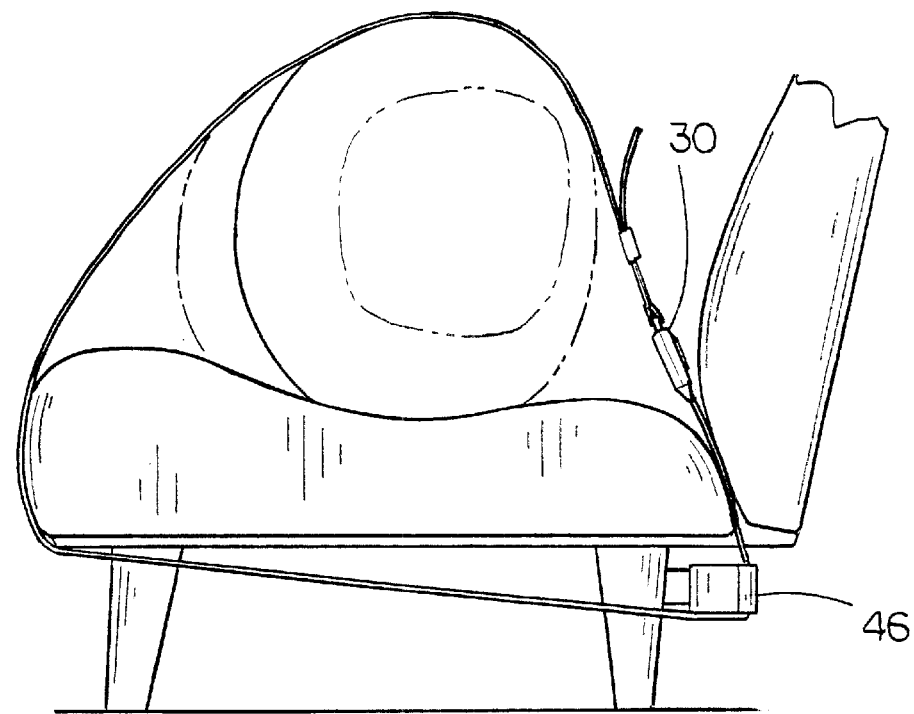
FIG. 8 is a right side elevational view of the safety restraint with first and second belts adapted to encircle the bench portion of a seat.
Figure 9:
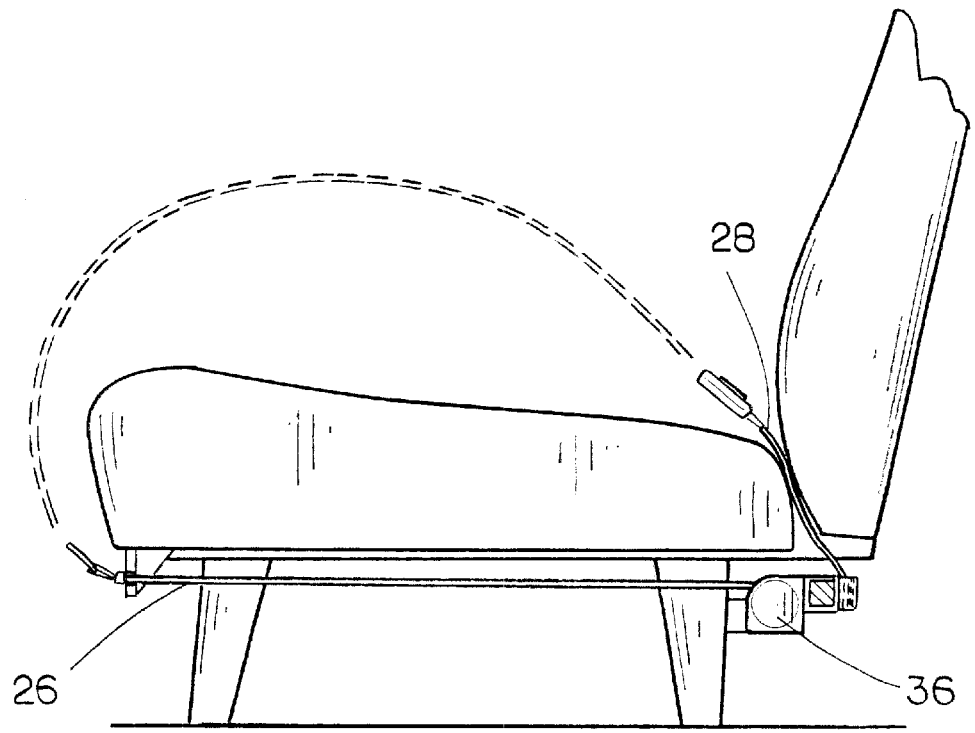
FIG. 9 is a right side elevational view of the safety restraint incorporating a selectively locking mechanism for rolling and unrolling a belt.
Figure 11:
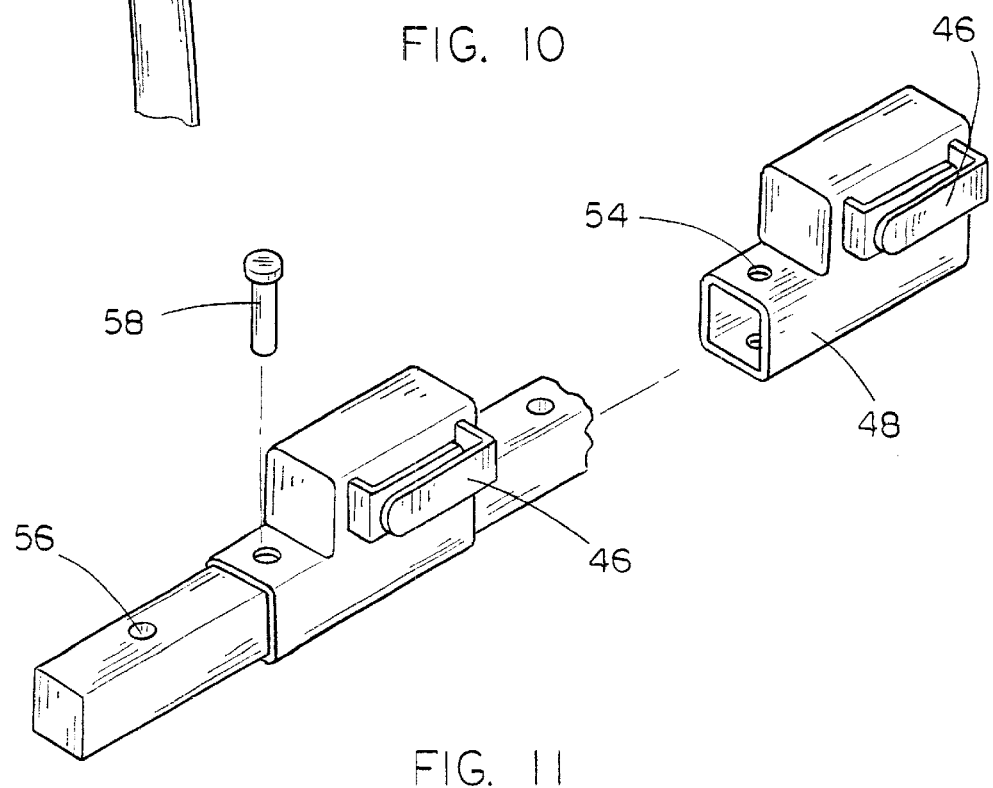
FIG. 11 is a perspective view of an elongated member adapted to receive a plurality of moveable brackets.

Preferably, elongated member 44 is adapted to receive at least two adjustable brackets 48. As shown in FIG. 11, each adjustable bracket 48 must include means for retaining a belt therein and means for securing the bracket to a position on the elongated member 44. Means for retaining the belt therein may include overlapping tabs 46, a U-shaped bolt 50 retained in place by at least one nut 52, or other means well-known in the art. An example of a structure for securing the bracket to a position on the elongated member 44 is shown in FIGS. 7 and 11. This structure comprises a hole 54 in the adjustable bracket 48, a series of corresponding holes 56 in the elongated member 44, and a retainer pin 58 adapted to fit through both the hole 54 and a corresponding hole 56, thereby preventing the lengthwise movement of the adjustable bracket 48 on the elongated member 44. Obviously, numerous other structures may be used to retain the adjustable bracket 48 in place.

As previously described, first and second belts 14 and 16 may each be comprised of an adjustable belt 26 and a fixed belt 28 adapted to extend over a passenger. For this configuration to be longitudinally adjustable, a second elongated member 60 must be mounted proximal the side of sleeping surface 20 opposite the elongated member 44. For each transverse belt, adjustable belt 26 must be mounted on either the elongated member 44 or the second elongated member 60. Fixed belt 28 must be mounted opposite the adjustable belt 26 on the other of the elongated member 44 or the second elongated member 60. Similarly, where first and second belts 14 and 16 are comprised of an adjustable belt 26 and a fixed belt 28 adapted to extend around a passenger and return the point of origin, both adjustable belt 26 and fixed belt 28 may be mounted on a single adjustable bracket 48.

If first and second belts 14 and 16 are each comprised of an adjustable belt 26 and a fixed belt 28, preferably each belt is permanently attached to an adjustable bracket 48 as previously described. Each belt may, however, be mounted on the elongated member 44 or the second elongated member 60 by any means which would allow the user to place the belt in a position appropriate for his/her size and to secure the belt in that position.

The first and second belts 14 and 16 share many characteristics with the diagonal belt 12. Adjustable belt 26 and fixed belt 28 of each of the diagonal belt 12 and the first and second belts 14 and 16 are joined by a selectively releasable means 30 as previously described. The lengths of each of the diagonal belt 12 and the first and second belts 14 and 16 are variable by implementation of an adjustable belt 26 in the manner previously described. If the first and second belts 14 and 16 are each comprised of a single belt having first and second ends 40 and 42, which are joined together by selectively releasable means 30, either of the first or second ends 40 or 42 may incorporate means for adjusting the length of the belt such as a frictional adjustable buckle 38.

Figure 12:
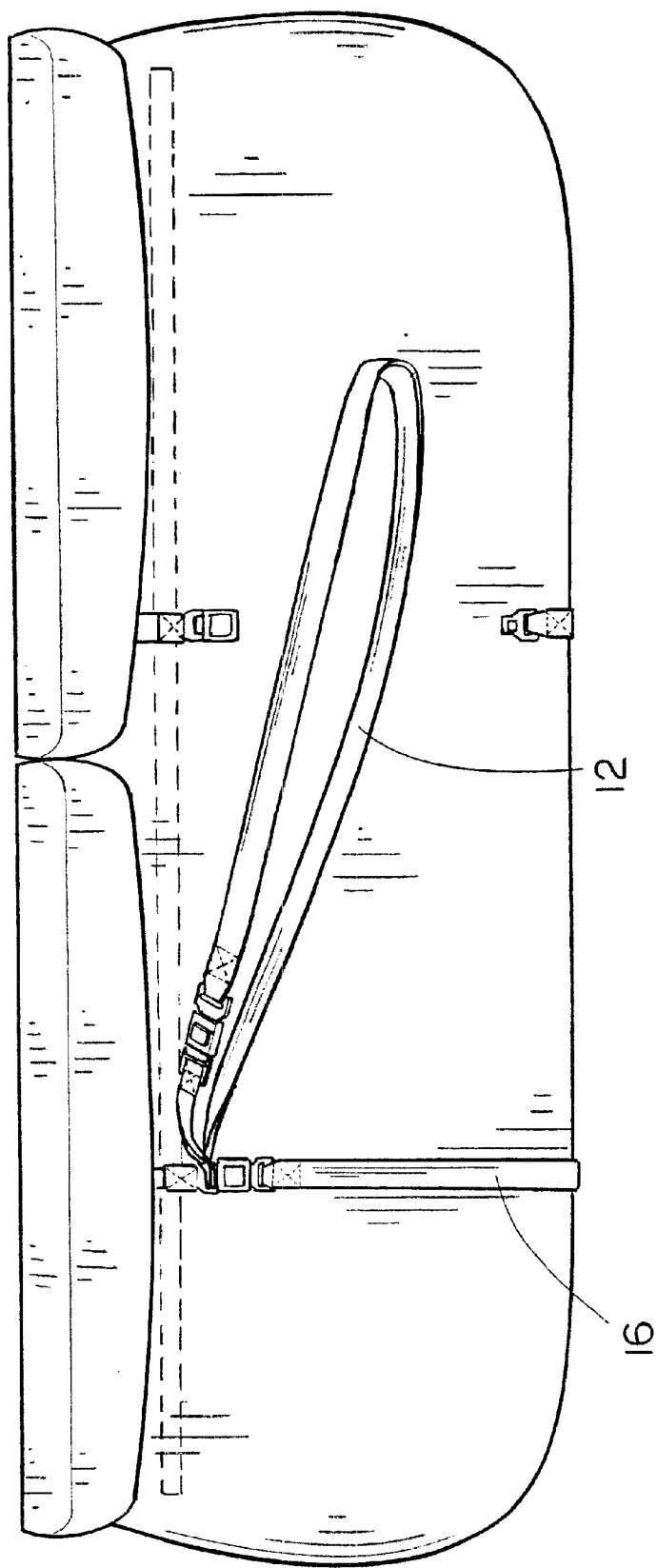
FIG. 12 is a top view of the safety restraint with an integral second and diagonal belt.

Diagonal belt 12 may also be longitudinally adjustable. This may be achieved by mounting an additional adjustable bracket 48 on the elongated member 44. Where a "Chena" belt is to be used, an additional adjustable bracket 48 must be provided on the second elongated member 60 and positioned opposite the point of origin of the diagonal belt 12. Alternatively, diagonal belt 12 may be secured to either of the first or second belts 14 or 16, or any of the adjustable brackets 48 supporting first or second belts 14 and 16. An example of this configuration is shown in FIG. 12 with a "Kuta" belt 22 attached to a fixed belt 28 of the second belt 16. If the diagonal belt 12 is to be mounted on either of the first or second belts 14 and 16, it is preferred that the diagonal belt 12 be mounted on the second belt 16 to position the diagonal belt 12 at an angle that is comparatively acute to the longitudinal axis of the passenger.

Figure 14:
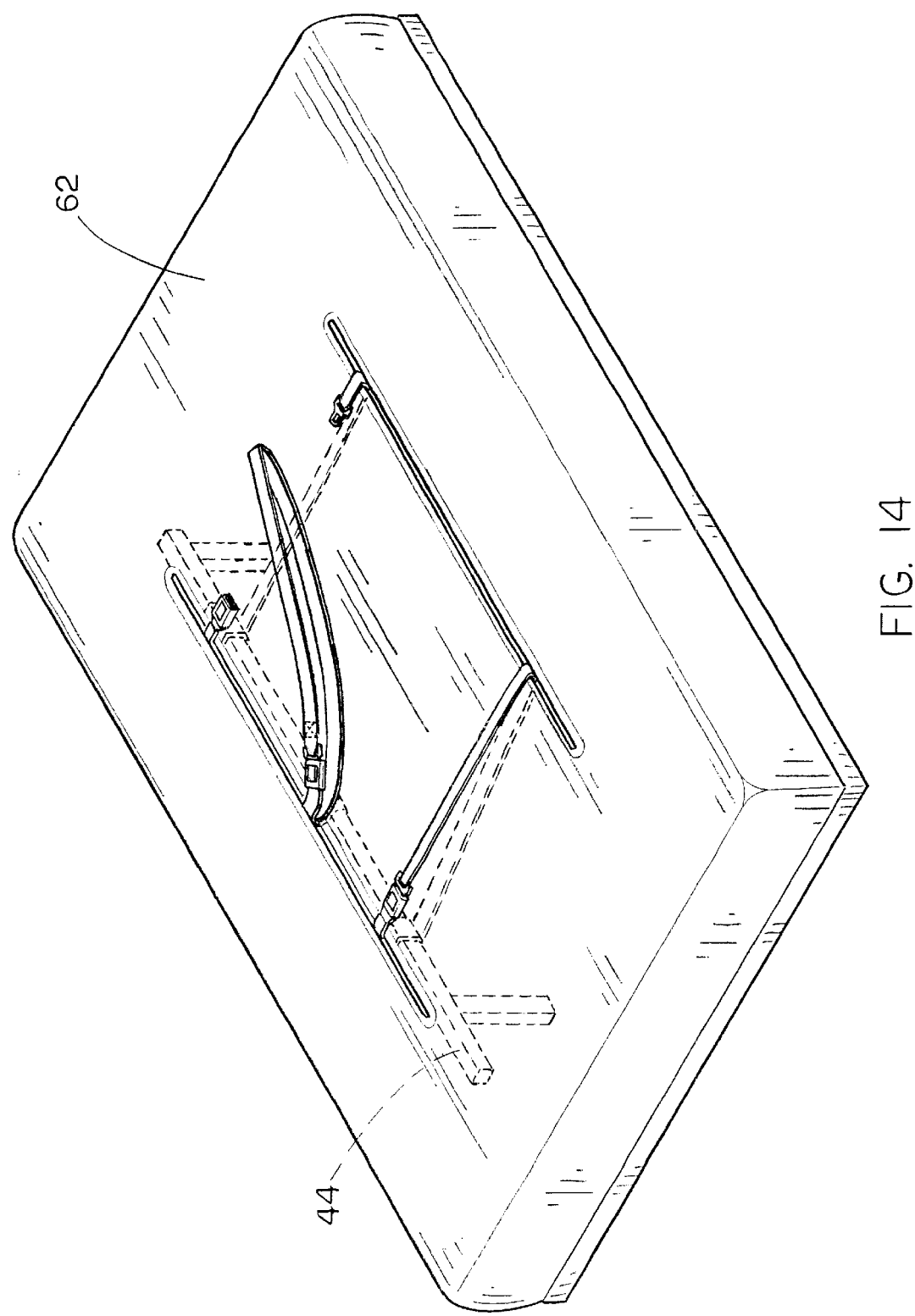
FIG. 14 is a perspective view of the safety restraint used in conjunction with a flat bed having a single rigid support.

Safety restraint 10 may be used in an environment where the sleeping surface 20 comprises a bed 62, as shown in FIGS. 13 and 14. Bed 62 must include channels 64 through which the safety restraint 10 extends. The different configurations of the safety restraint 10 previously described may be implemented in this environment. Each or any of the diagonal belts 12 and the first and second belts 14 and 16 may be longitudinally adjustable or fixed. Diagonal belt 12 may be a "Kuta" belt 22 or a "Chena" belt 24. First and second belts 14 and 16 may be comprised of a single belt having first and second ends 40 and 42, or of an adjustable belt 26 and a fixed belt 28. It should be noted that the channels 64 should be parallel and spaced apart a distance that approximates the width of the passenger. This structure will allow the first belt 14 to be worn comfortably under the arms of the passenger and will restrict the movement of the passenger in the event of the application of sudden force.

In use, diagonal belt 12 is secured around the shoulder of the passenger, first belt 14 is secured around the chest and under the arms of the passenger, and second belt 16 is secured around the thighs of the passenger. Diagonal belt 12 prevents the movement of the passenger across the sleeping surface 20 in a direction toward his head by restraining his shoulder. First and second belts 14 and 16, alone or in combination with one another, prevent the movement of the passenger across the sleeping surface 20 in a direction transverse to the longitudinal axis of the body of the passenger by restraining the chest and thighs, respectively. Where the configuration shown in FIG. 15 is used, first and second belts 14 and 16 prevent the movement of the passenger only in a direction away from the upright padded surface 66. First belt 14 prevents the movement of the passenger in a direction across the sleeping surface 20 in a direction toward his feet by applying pressure to the underarms of the passenger. In the event a force is applied from a different angle, a combination of all the belts will protect the passenger.

Figure 5:
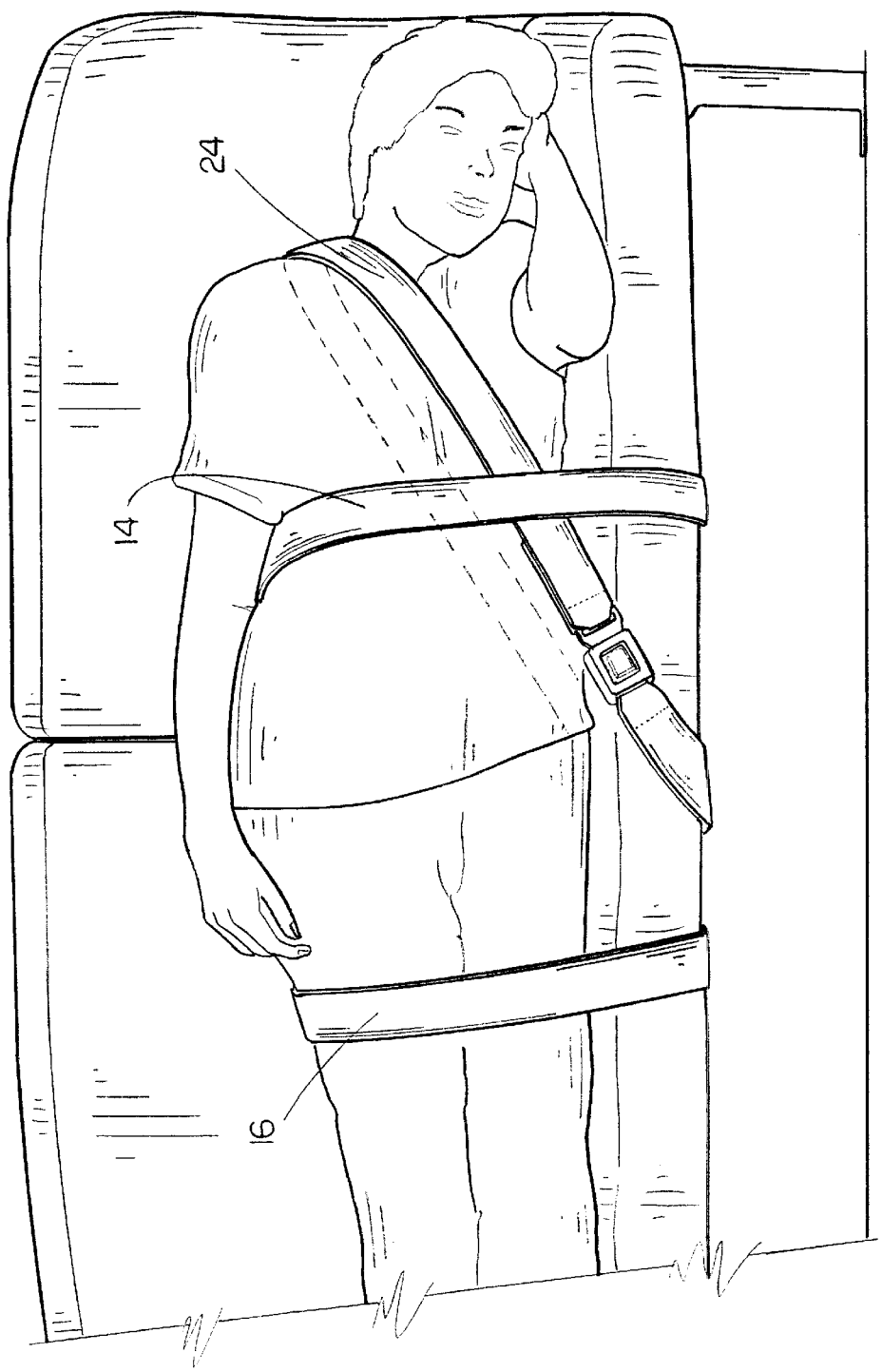
FIG. 5 is a front elevational view of the same with the passenger lying on his/her side.

As shown in FIGS. 4, 5, and 6, diagonal belt 12 and first belt 14 substantially encircle a shoulder of the passenger. This configuration serves two purposes. As previously described, the combination of the diagonal belt 12, the first belt 14, and the optional second belt 16 protect the passenger despite the application of sudden force, which, for example, would be experienced in the event of a collision. The passenger is protected from collisions that occur from any direction. Furthermore, the passenger is protected because the belts restrain the passenger by applying force to parts of the body that are less susceptible to damage, for example, the shoulder, chest, and thighs, than other parts of the body, for example, the neck and abdomen. Damage to the body may be further minimized by implementation of wide belts, which would lower the force per unit area applied to the portion of the body in contact with the belts.

This configuration also serves the purpose of maintaining the position of the diagonal belt 12 and the first belt 14 in a constant position relative to the passenger's body. Many people are inclined to move in their sleep. Prior art restraints that employ only transverse belts cannot prevent a passenger from moving longitudinally such that the belts may be placed against a vulnerable part of the body, such as the neck, or from moving out of the restraint completely. The structure of the present invention prevents this occurrence.

Figure 16:
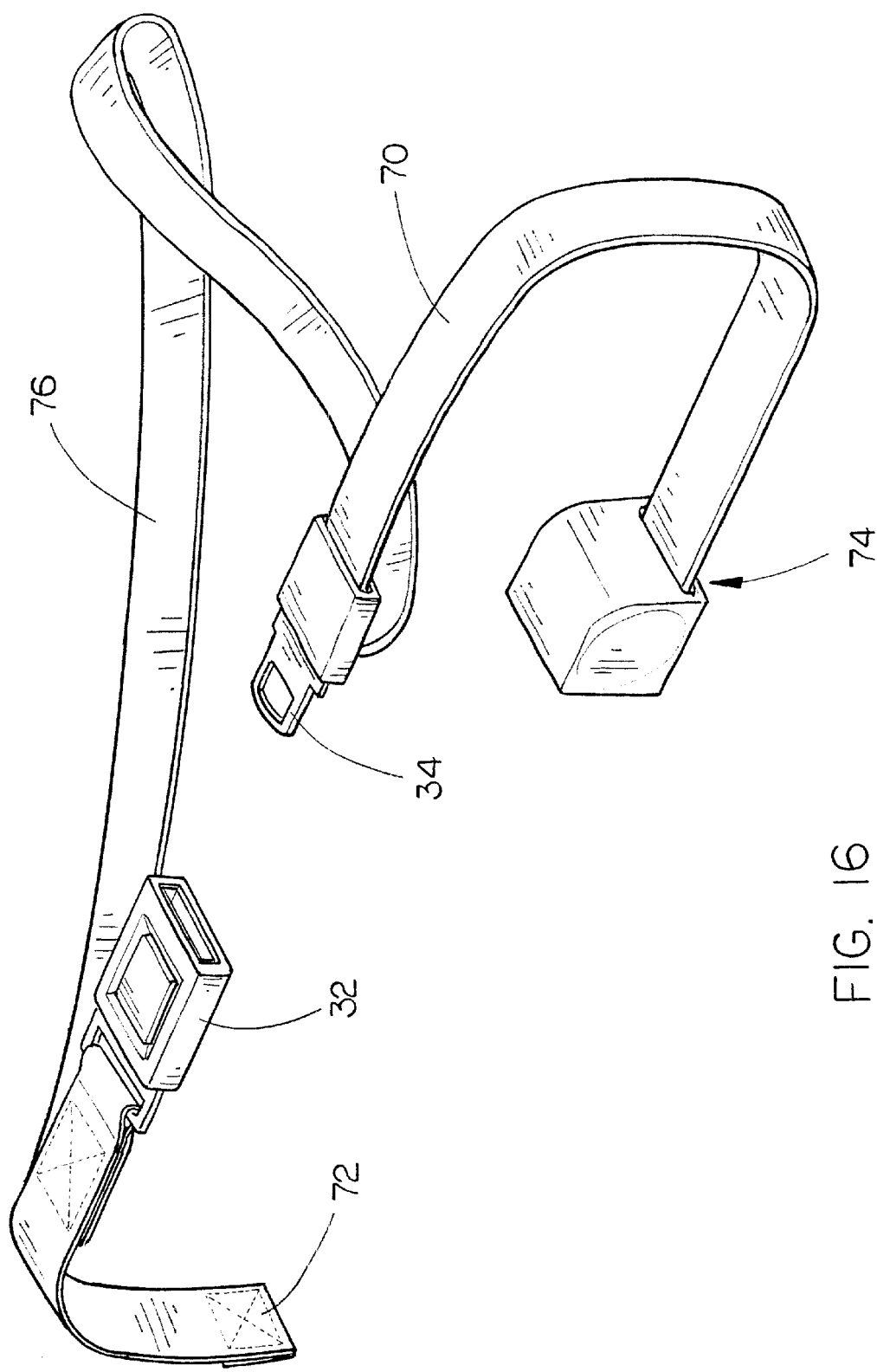
FIG. 16 is a perspective view of a single-belt safety restraint for use in a passenger vehicle.

Another embodiment of safety restraint 10 replaces the use of diagonal belt 12 with single belt 70. As shown in FIG. 16, single belt 70 is provided with a first end 72 and a second end 74. Preferably, a buckle 32 is secured to single belt 70 in a fixed position adjacent first end 72 and a tab 34 is adjustably secured to single belt 70 adjacent second end 74. It is contemplated, however, that buckle 32 could be secured to the sleeping surface 20, the frame of the vehicle, or to the components of the safety restraint 10 described herein, rather than single belt 70, so long as the buckle 32 is disposed adjacent the first end of single belt 70.

Much like diagonal belt 12, single belt 70 must be of adjustable length to circumscribe passengers of different sizes. This is preferably accomplished by securing the second end 74 within a selectively locking mechanism 36 for rolling and unrolling the second end 74 of single belt 70 during initial adjustment and retaining single belt 70 at the adjusted length during impact. Other means of providing a belt of adjustable length, some of which are described hereinabove, are known in the art and can be incorporated by the single belt 70. Regardless of the adjusting means used, the first and second ends of single belt 70 are mounted to frame member 18 of the sleeping surface 20, the frame of the vehicle, or to the components of the safety restraint 10 described herein.

Figure 19:
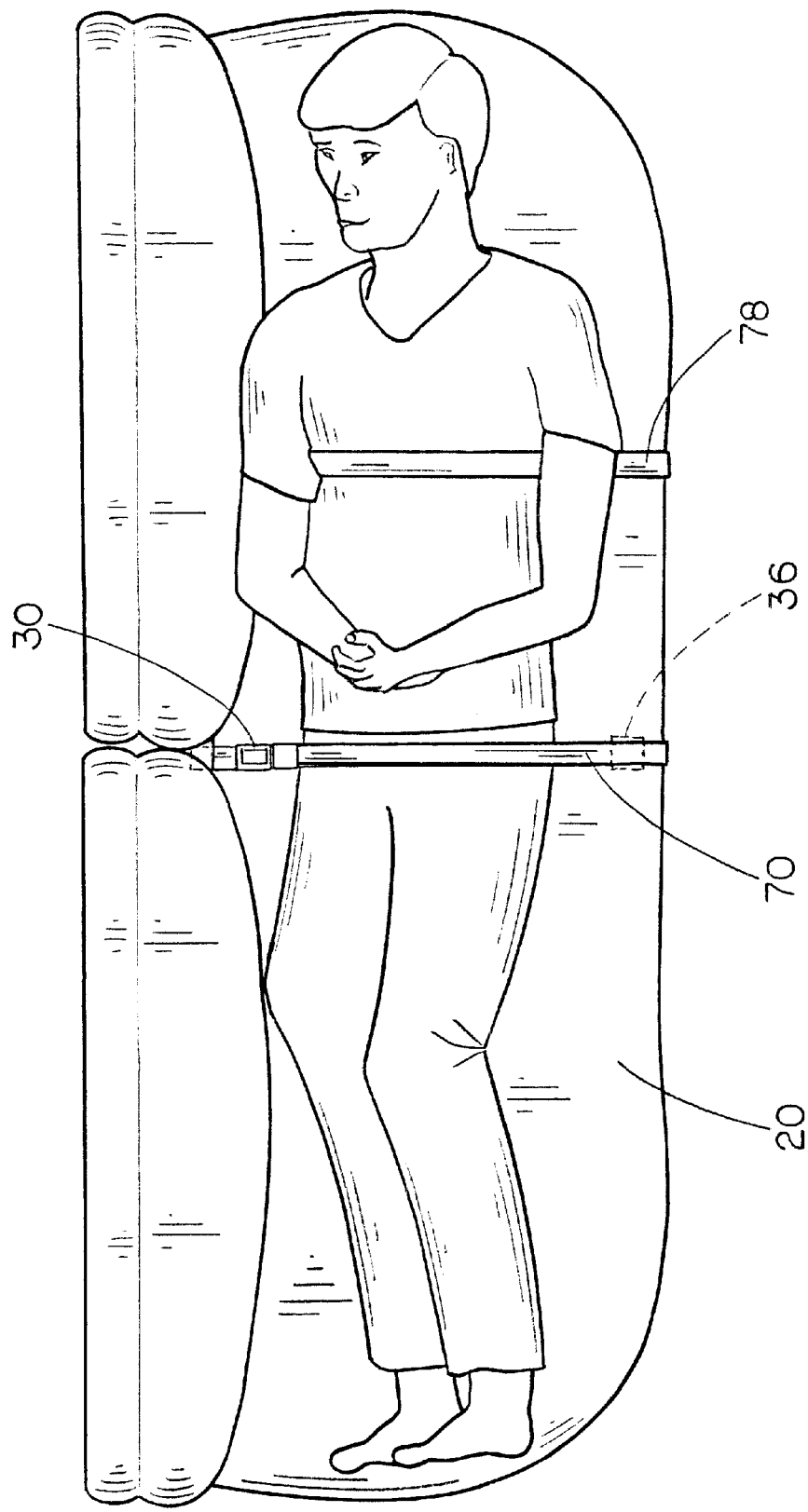
FIG. 19 is a top view of the single-belt safety restraint in a transverse-only use with an additional transverse belt.

In the stored position, single belt 70 is positioned generally transverse to sleeping surface 20, with any slack being secured within locking mechanism 36. In use, single belt 70 may be generally configured in one of three ways. In a first configuration, shown in FIG. 19, the passenger lies on top of single belt 70 with the first and second ends of single belt 70 proximal the passenger hips. The passenger then unrolls a selective portion of single belt 70 from the locking mechanism 36 and adjusts the position of tab 34 along the length of single belt 70 so that it can be releasably connected to buckle 32, forming selectively releasable means 30. In this configuration, single belt 70 extends over the passenger in a generally transverse direction, securing the middle portion of the passenger.

Figure 17:
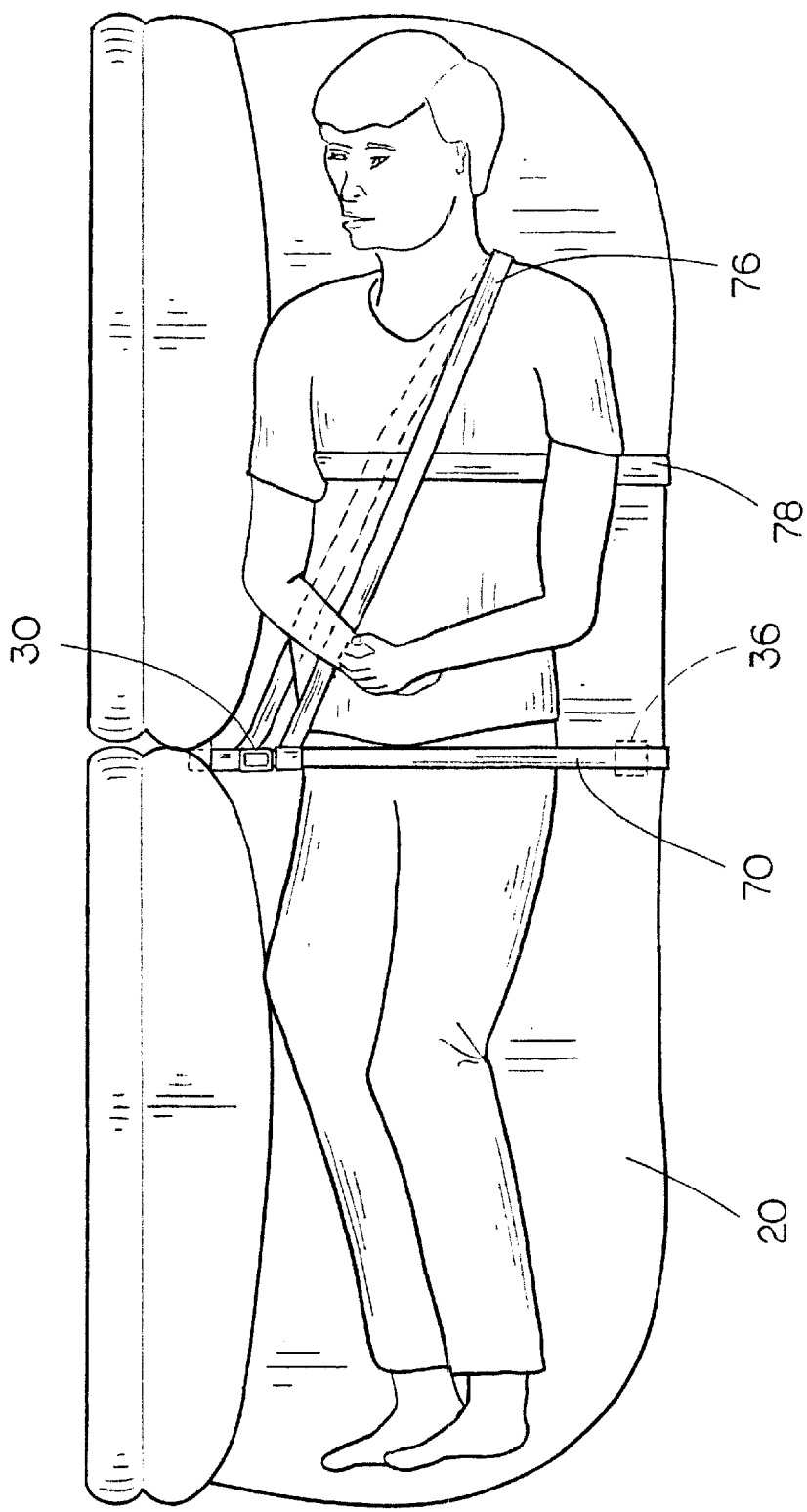
FIG. 17 is a top view of the single-belt safety restraint in use with an additional transverse belt.

In a second configuration, shown in FIG. 17, single belt 70 is used in a "Kuta" belt and transverse belt combination. In this configuration, the passenger selectively unrolls a portion of single belt 70 from locking mechanism 36 and adjusts the position of tab 34 along single belt 70 so that the passenger can extend the middle portion 76 of single belt 70 from buckle 32, along the passenger's back to the passenger's shoulder opposite buckle 32. The passenger then loops the middle portion 76 over his/her shoulder, extends tab 34 across the front of his/her body, and releasably secures tab 34 into buckle 32. In this configuration, the passenger has extended the middle portion 76 from the passenger's shoulder in a generally diagonal direction toward buckle 32. The portion of single belt 70 adjacent the second end 74 is extended in a generally transverse direction over the passenger's body. Thus this configuration secures the passenger in a "Kuta" belt and transverse belt configuration using a single belt.

Figure 20:
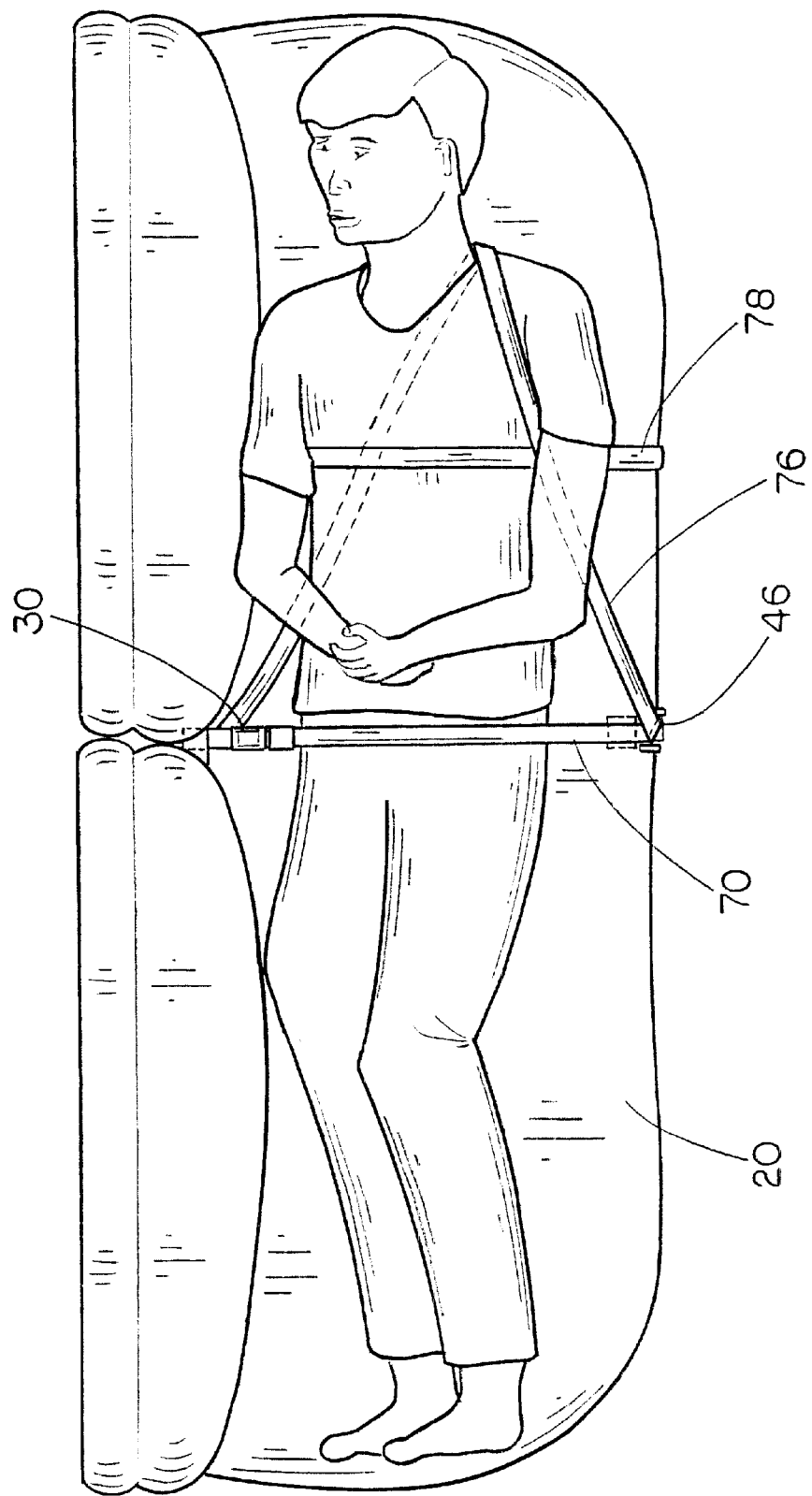
FIG. 20 is a top view of the single-belt safety restraint is adapted to be used in the "Chena" position, in use with an additional transverse belt.

In a third configuration, shown in FIG. 20, single belt 70 is used in a "Chena" belt and transverse belt combination. In this configuration, the passenger adjusts and secures the single belt 70 in generally the same way as the second configuration. However, the "Kuta" belt position of the second configuration is transformed into a "Chena" belt position using an overlapping tab 46, or other clip or belt retaining means known in the art. Overlapping tab 46 is secured to frame member 18 of sleeping surface 20, closely adjacent the second end of single belt 70 and proximal the passenger's hip. The passenger secures middle portion 76 within overlapping tab 46 so that the middle portion 76 extends from the passenger's shoulder to a point adjacent the second end 74 of single belt 70 and then in a generally transverse direction toward the first end 72 of single belt 70. Thus this configuration secures the passenger in a "Chena" belt and transverse belt configuration using a single belt.

Figure 18:
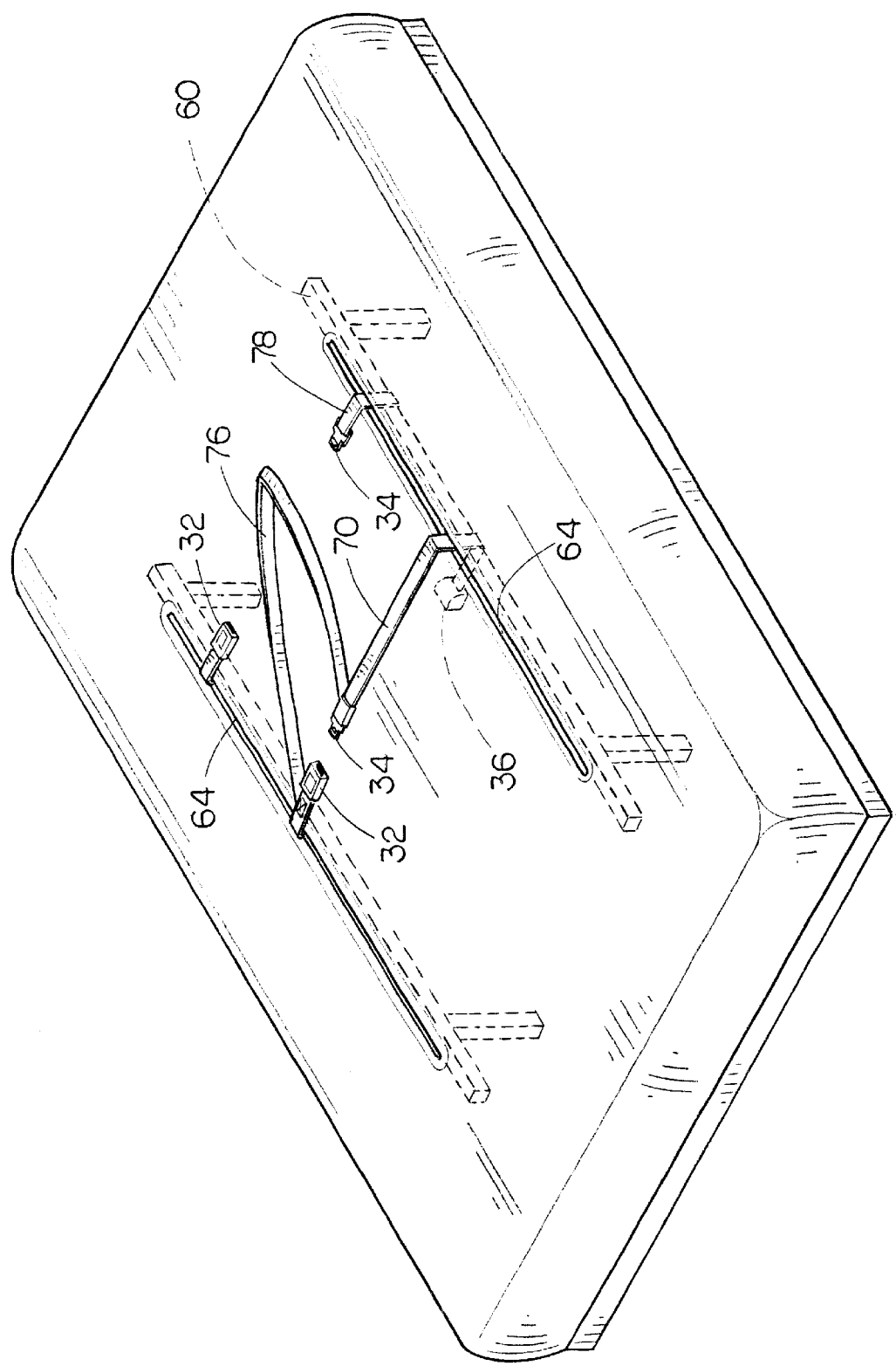
FIG. 18 is a perspective view of the single-belt safety restraint used in conjunction with an additional transverse belt and a flat bed having rigid supports proximal both sides of the bed.

The various configurations of single belt 70 can also be used in an environment where the sleeping surface 20 comprises a bed 62, as shown in FIG. 18. Bed 62 must generally include channels 64 through which the first and second ends of single belt 70 can extend. Channels 64 should be parallel and spaced apart a distance that approximates the width of the passenger. The first end 72 is preferably secured to elongated member 60 or other structural member as discussed previously. Although other methods and structure could be used, the preferred embodiment secures second end 74 to a second elongated member 60 by and through a selectively locking mechanism 36. In this arrangement, single belt 70 can function and be used in any of the three configurations discussed previously.

Regardless of the type of sleeping surface on which safety restraint 10 is used, or the configuration of single belt 70 selected, a second belt 78 can be employed for additional passenger security. Second belt 78 can be structurally similar to belts 14 and 16 or single belt 70, as such belts are described above. When the two belts are used together, they are secured to the vehicle in spaced relation to one another so that single belt 70 is proximal, but slightly below, the passenger's hips. Second belt 78 is positioned proximal the passenger's chest, closely adjacent his/her axilla. This structure will allow the second belt 78 to be worn comfortably under the arms of the passenger and will assist single belt 70 in restricting the longitudinal and transverse movement of the passenger in the event of the application of sudden force. Moreover, when second belt 78 is identical in structure to single belt 70, the passenger can be placed on the sleeping surface 20 in either longitudinal direction without sacrificing the benefit of a multidirectional (diagonal and transverse) belt and second transverse belt combination.

Safety restraint 10 is beneficial in that it is comfortable for the passenger. Although longitudinal movement is restricted, the belts allow the passenger to roll from his back to his side, his side to his chest, or such similar movements. It is preferred that the belts be made of material that is thin and flexible so a passenger can lie on a belt with no discomfort.

Thus it can be seen that the invention accomplishes at least all of the stated objectives.

I claim:

1. In combination:
   a vehicle having a sleeping surface with an upper surface and a length along which a passenger may lie in a horizontal position;
   a safety restraint for a passenger lying in a horizontal position; said safety restraint comprising:
   at least a first belt and a transverse belt;
   said first belt having first and second ends, said first belt being operatively secured to the vehicle at said first end, having means for adjusting the length thereof, being positioned diagonally in relation to the length of the sleeping surface, and being positioned on the upper surface of the sleeping surface;
   said transverse belt being operatively secured to the vehicle and being located distally from the first belt along the length of the sleeping surface, said transverse belt being positioned transverse to the length of the sleeping surface and having means for adjusting the length thereof;
   said first belt being adapted to be secured over the shoulder of the passenger;
   said transverse belt being adapted to be secured over the torso of the passenger;
   said sleeping surface including a side edge thereof and said first belt is mounted on the vehicle proximal the side edge of the sleeping surface; said first belt being adapted to be positioned proximal the hips of the passenger at said first end thereof, said first belt further comprising a latching means operatively mounted on said second end of said first belt, and a receiving means operatively mounted on the vehicle closely adjacent said first end of said first belt for positioning proximal the hips of the passenger, said latching means being releasably attachable to said receiving means.

2. In combination:
   a vehicle having a sleeping surface with an upper surface and a length along which a passenger may lie in a horizontal position;
   a safety restraint for a passenger lying in a horizontal position; said safety restraint comprising:
   at least a first belt and a second belt;
   said first belt having first and second ends, said first belt being operatively secured to the vehicle, being positioned transverse to the length of the sleeping surface and having means for adjusting the length thereof; and
   said second, belt having first and second ends, said second belt being operatively secured to the vehicle, having means for adjusting the length thereof, being positioned diagonally in relation to the length of the sleeping surface, and being positioned on the upper surface of the sleeping surface;
   said first belt being adapted to be secured over the torso of the passenger;
   said second belt being adapted to be secured over the shoulder of the passenger;
   said sleeping surface including a side edge thereof and said second belt is mounted on the vehicle proximal the side edge of the sleeping surface; said second belt adapted to be positioned proximal the hips of the passenger at said first end thereof, said second belt further comprising a second latching means mounted on a second end of said second belt, and a second receiving means mounted on the vehicle for positioning proximal the hips of the passenger, said second latching means being releasably attachable to said second receiving means.

3. In combination:
   a vehicle having a sleeping surface with an upper surface, opposite sides, and a length along Which a passenger may lie in a horizontal position;
   a safety restraint for a passenger lying in a horizontal position; said safety restraint comprising:
   at least a first belt, having first and second ends, a receiving means, and a latching means;
   said receiving means being operatively secured to said vehicle adjacent said first end of said first belt; said latching means being adjustably secured to said first belt adjacent said second end;
   said receiving means and latching means being adapted to be releasably coupled to each other;
   said first and second ends of said first belt being operatively secured to the vehicle, closely adjacent said opposite sides of the sleeping surface;
   said first belt having means for adjusting the length thereof;
   said first belt comprising first and second portions wherein said first portion of the belt is positioned generally transverse the upper surface of the sleeping surface, and said second portion is positioned generally diagonal the upper surface of the sleeping surface.

4. The safety restraint of claim 3 wherein said receiving means is operatively secured to said first belt, adjacent said first end of said first belt.

5. The safety restraint of claim 3 wherein said second portion of said first belt being adapted to be secured over the shoulder of the passenger in a generally diagonal direction across the chest and back of the passenger.

6. The safety restraint of claim 5 wherein said first portion of said first belt being adapted to be further secured transversely across the body of the passenger, proximal the hips of the passenger, to a point adjacent said first end of said first belt.

7. The safety restraint of claim 3 wherein said second portion of said first belt being adapted to be secured over the shoulder of the passenger in a generally diagonal direction across the back of the passenger, over the passenger's shoulder, and in a generally longitudinal direction over the chest and abdomen of the passenger to a point proximal said second end of said first belt.

8. The safety restraint of claim 7 wherein said first portion of said first belt being adapted to be further secured transversely across the body of the passenger, proximal the hips of the passenger, to a point adjacent said first end of said first belt.

9. The safety restraint of claim 3 wherein said first portion of said first belt being adapted to be secured transversely across the body of the passenger, proximal the hips of the passenger.

10. In combination:
   a vehicle having a sleeping surface with an upper surface, opposite sides, and a length along which a passenger may lie in a horizontal position;
   a safety restraint for a passenger lying in a horizontal position; said safety restraint comprising:
      at least a first belt, having first and second ends, a receiving means, and a latching means;
      said receiving means being operatively secured to said vehicle adjacent said first end of said first belt; said latching means being adjustably secured to said first belt adjacent said second end;
      said receiving means and latching means being adapted to be releasably coupled to each other;
      said first and second ends of said first belt being operatively secured to the vehicle, closely adjacent said opposite sides of the sleeping surface;
      said first belt having means for adjusting the length thereof;
      said first belt comprising a first and second portion wherein said first portion of the belt is positioned generally transverse the upper surface of the sleeping surface, and said second portion is positioned generally diagonal the upper surface of the sleeping surface;
      said second portion of said first belt being adapted to be secured over the shoulder of the passenger in a generally diagonal direction across the chest and back of the passenger;
      said first portion of said first belt being adapted to be further secured transversely across the body of the passenger, proximal the hips of the passenger, to a point adjacent said first end of said first belt; and
      at least one additional transverse belt operatively secured to the vehicle and located distally from the first belt along the length of the sleeping surface, said at least one additional belt being positioned transverse to the length of the sleeping surface and having means for adjusting the length thereof; said at least one additional belt being adapted to be secured over the chest of the passenger.

11. In combination:
   a vehicle having a sleeping surface with an upper surface, opposite sides, and a length along which a passenger may lie in a horizontal position;
   a safety restraint for a passenger lying in a horizontal position; said safety restraint comprising:
      at least a first belt, having first and second ends, a receiving means, and a latching means;
      said receiving means being operatively secured to said vehicle adjacent said first end of said first belt; said latching means being adjustably secured to said first belt adjacent said second end;
      said receiving means and latching means being adapted to be releasably coupled to each other;
      said first and second ends of said first belt being operatively secured to the vehicle, closely adjacent said opposite sides of the sleeping surface;
      said first belt having means for adjusting the length thereof;
      said first belt comprising a first and second portion wherein said first portion of the belt is positioned generally transverse the upper surface of the sleeping surface, and said second portion is positioned generally diagonal the upper surface of the sleeping surface;
      said second portion of said first belt being adapted to be secured over the shoulder of the passenger in a generally diagonal direction across the back of the passenger, over the passenger's shoulder, and in a generally longitudinal direction over the chest and abdomen of the passenger to a point proximal said second end of said first belt;
      said first portion of said first belt being adapted to be further secured transversely across the body of the passenger, proximal the hips of the passenger, to a point adjacent the first end of said belt; and
      at least one additional transverse belt operatively secured to the vehicle and located distally from the first belt along the length of the sleeping surface, said at least one additional belt being positioned transverse to the length of the sleeping surface and having means for adjusting the length thereof; said at least one additional belt being adapted to be secured over the chest of the passenger.

12. In combination:
a vehicle having a sleeping surface with an upper surface, opposite sides, and a length along which a passenger may lie in a horizontal position;
a safety restraint for a passenger lying in a horizontal position; said safety restraint comprising:
   at least a first belt, having first and second ends, a receiving means, and a latching means;
   said receiving means being operatively secured to said vehicle adjacent said first end of said first belt; said latching means being adjustably secured to said first belt adjacent said second end;
   said receiving means and latching means being adapted to be releasably coupled to each other;
   said first and second ends of said first belt being operatively secured to the vehicle, closely adjacent said opposite sides of the sleeping surface;
   said first belt having means for adjusting the length thereof;
   said first belt comprising a first and second portion wherein said first portion of the belt is positioned generally transverse the upper surface of the sleeping surface, ad said second portion is positioned generally diagonal the upper surface of the sleeping surface;
   said first portion of said first belt being adapted to be secured transversely across the body of the passenger, proximal the hips of the passenger; and at least one additional transverse belt operatively secured to the vehicle and located distally from the first belt along the length of the sleeping surface, said at least one-additional belt being positioned transverse to the length of the sleeping surface and having means for adjusting the length thereof; said at least one additional belt being adapted to be secured over the chest of the passenger.

* * * * *